June 23, 1953   P. C. WILSON   2,642,960
BRAKE SAFETY MECHANISM
Filed Dec. 1, 1949   3 Sheets-Sheet 1

INVENTOR.
Palmer Clyde Wilson
BY
HIS ATTORNEYS

June 23, 1953   P. C. WILSON   2,642,960
BRAKE SAFETY MECHANISM
Filed Dec. 1, 1949   3 Sheets-Sheet 2

INVENTOR.
Palmer Clyde Wilson
BY
Webb Mackey & Burden
HIS ATTORNEYS

June 23, 1953 P. C. WILSON 2,642,960
BRAKE SAFETY MECHANISM
Filed Dec. 1, 1949 3 Sheets-Sheet 3
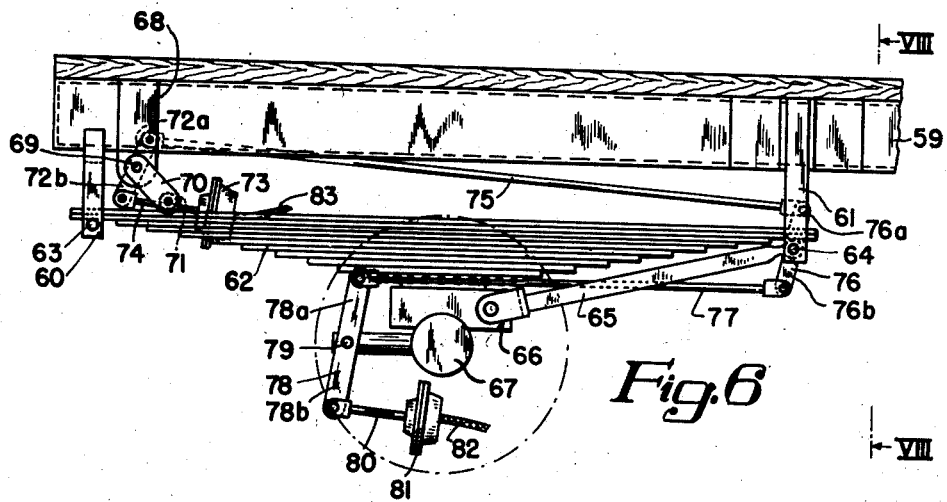
Fig. 6
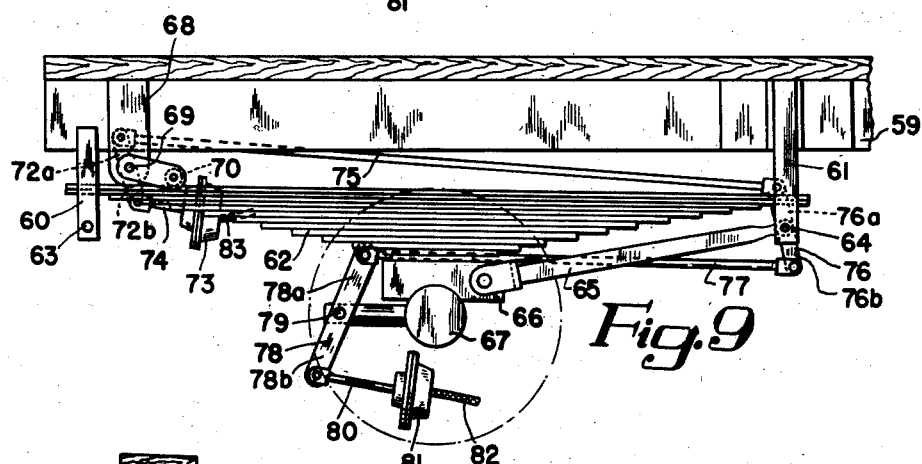
Fig. 9
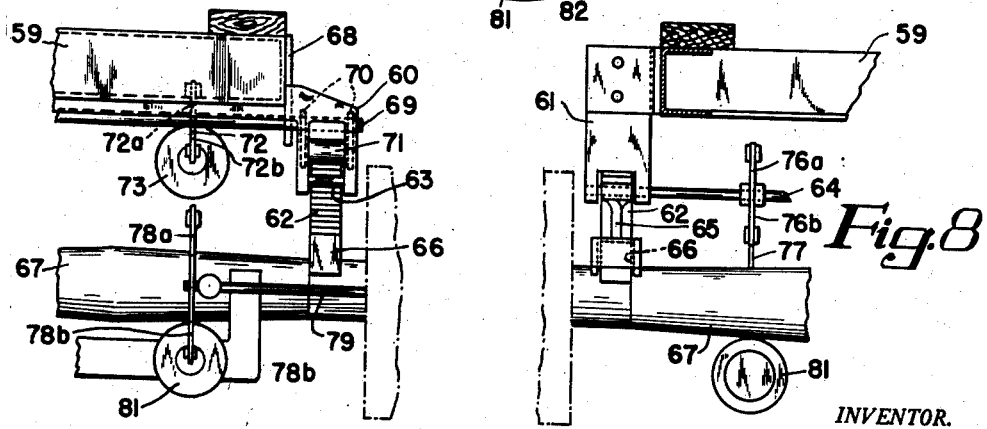
Fig. 7
Fig. 8
INVENTOR.
Palmer Clyde Wilson
BY
HIS ATTORNEYS Patented June 23, 1953

2,642,960

UNITED STATES PATENT OFFICE 2,642,960

BRAKE SAFETY MECHANISM

Palmer Clyde Wilson, Uniontown, Pa.

Application December 1, 1949, Serial No. 130,548

7 Claims. (Cl. 188—106)

This application relates to brake safety mechanism which is particularly adapted for trucks, trailers, etc. equipped with conventional air brakes. Such brakes have a drum and shoes which are pressed against the drum by a cam mounted on a rotatable shaft. The trucks or trailers also carry diaphragm housings and pistons movable therein which are connected to a lever on the cam shaft. When air is admitted to the housings the pistons are moved to rotate the cam lever and shaft and apply the brakes. The trucks also have a reservoir of compressed air and some form of valve which can be controlled by the truck driver to admit compressed air to the diaphragm housing.

Frequently such air brakes fail. A sudden failure may develop in the reservoir, the diaphragm housing or the hose connections between the reservoir and the housing in which case all braking action is immediately lost. More often, however, a slow leak develops in the air system and the effectiveness of the brakes will slowly decrease until suddenly the driver realizes that he cannot stop the truck. Whatever the cause of the failure, the results have generally been disastrous. I have invented brake safety mechanism whereby the brakes are automatically applied when the pressure of the air in the system drops below the pressure required for normal operation of the brakes. If the air pressure drops slowly, the brakes will be applied slowly in which case the driver will realize from the drag on his engine that the air pressure is slowly dropping. On the other hand, if the pressure drops rapidly, the brakes will be applied with equal rapidity.

In my invention I employ the weight of the truck or trailer chassis, the body of the truck or chassis and whatever load may be carried to apply the brakes on failure of the air supply. My safety mechanism, therefore, is not dependent upon the maintenance of any emergency equipment such as an extra air reservoir which would have to be kept in good working condition and with air under suitable pressure at all times. I employ rotatable levers which are placed between the truck or trailer chassis and the spring on which the chassis is mounted and which are rotated whenever the chassis moves toward the springs. The levers are connected mechanically to the cam lever on the brakes so that rotation of the lever applies the brakes. I also provide one or more diaphragm housings and pistons therein which are connected to the levers between the chassis and the springs. These housings are supplied with air from the air reservoir used for normal operation of the brakes. Whenever the air pressure in the reservoir is sufficient for good braking action, the diaphragm piston is moved outwardly from the housing against the levers to hold them against turning under the weight of the truck chassis. Whenever the air in the air reservoir drops below a certain prescribed minimum pressure, the weight of the chassis, truck or trailer body and load is sufficient to rotate the levers and apply the brakes.

In the accompanying drawings, I have illustrated certain present preferred embodiments of my invention, in which—

Figure 6 is a view similar to Figure 1 showing another modification of my invention, the safety mechanism in that figure being in inoperative position;

Figure 7 is a view from the rear of the truck of the safety mechanism shown in Figure 6;

Figure 8 is a section along the lines VIII—VIII of Figure 6; and

Figure 9 is a view similar to Figure 6 but showing the mechanism in operative position.

Figure 1:
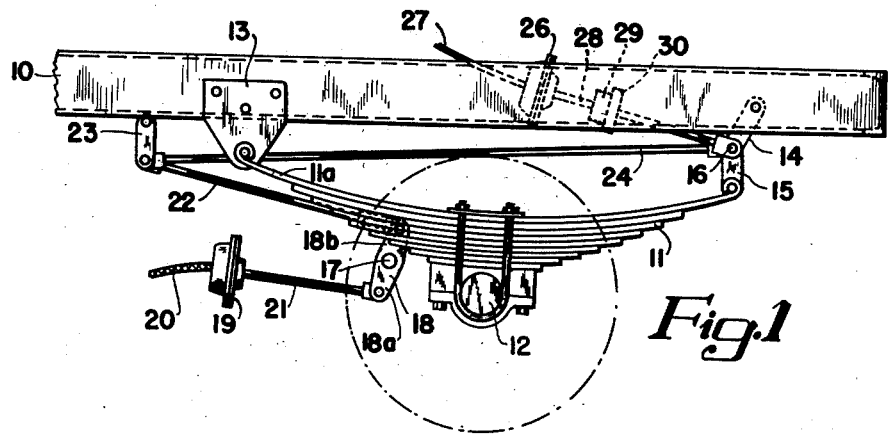
Figure 1 is a fragmentary side elevation of the rear of a truck or trailer with the wheel and brake removed, the figure showing my safety mechanism in its inoperative position.

Figure 1 shows a portion of a side channel 10 of a chassis of a truck or trailer to which my safety mechanism has been applied. The mechanism is generally applied to both rear wheels of a truck or trailer but only one is shown in the drawings since the mechanism for both wheels is the same. Conventional springs 11 mount the chassis on an axle housing 12. One end 11a of the springs is rotatably secured to a plate 13 which extends down from the side frame 10. This form of spring mounting is conventional. Two levers 14 and 15 secure the other end of the springs to the chassis, these levers taking the place of the conventional spring shackle. As shown in Figure 1, one end of the lever 14 is rotatably secured to the side frame 10 and the other end is rotatably secured to one end of the lever 15. The other end of the lever 15 rotates with the end of the springs 11. The levers 14 and 15 thus form a pair of toggle levers with a common pivot point 16 which is operatively connected to the brake by mechanical linkage hereinafter described.

The brake (not shown but the relative position of the drum of which is indicated by a chain line in Figure 1) has the customary shaft 17 and cam (not shown) for forcing brake shoes against the drum. A cam lever 18 is mounted on the shaft 17 to rotate the shaft and thereby apply the brakes. The truck or trailer carries a conventional diaphragm housing 19 which is connected by air hose 20 through a valve (not shown) under the control of the driver to a conventional air reservoir (also not shown). The housing 19 carries a diaphragm piston 21 which is connected to one arm 18a of the lever 18. By opening the valve the operator can supply air to the diaphragm housing 19 which in turn will move the diaphragm piston 21 to rotate the lever 18 and thereby apply the brakes. The arm 18b of the lever 18 is connected to a rod 22 which in turn is pivotally supported at its other end by a rotatable hanger arm 23 which extends down from the side frame 10. Another rod 24 connects the end of the rod 22 where it joins the hanger arm 23 with the common pivot point 16 of the two levers 14 and 15. The truck has a second diaphragm housing 26 which is supplied with air from the truck air reservoir by means of the air hose 27. The housing 26 carries a diaphragm piston 28 which is connected at its outer end to the common pivot point 16 of the levers 14 and 15.

Figure 1A:
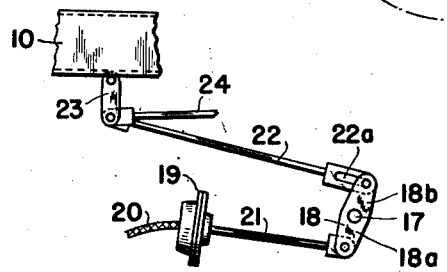
Figure 1A is a fragmentary view of certain lever linkage used in my safety mechanism.

Figure 1 shows my safety mechanism in inoperative position, that is, there is a sufficient supply of air under pressure in the truck reservoir. Air from the reservoir actuates the diaphragm piston 28 so that it pushes against the common pivot point 16 in a direction tending to straighten the levers 14 and 15. As will be pointed out below, it is important that the diaphragm piston 28 do not push the common pivot point 16 of the levers 14 and 15 as far as dead center and therefore I provide a stop 29 on the diaphragm piston 28 which abuts against a stop 30 carried by the truck chassis when the pivot point 16 is in the position shown in Figure 1, i. e., slightly to one side of dead center. Also there is a lost motion connection between the arm 18b of the lever 18 and the rod 22 so that the brakes can be applied in normal driving without interference from the safety mechanism. As shown in Figure 1A the rod 22 has a slot 22a through which the pin securing the rod and the lever passes. The lever 18 can thus be turned by the diaphragm piston 21 without moving the several parts of the safety mechanism.

Figure 2:
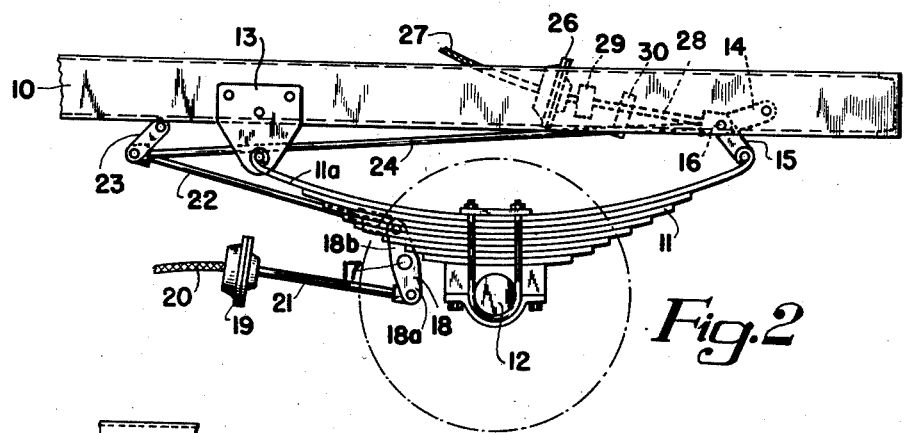
Figure 2 is a view similar to Figure 1 but showing my safety mechanism in operative position.

In the event of failure of the air supply in the truck for any reason the weight of the truck or trailer chassis, the truck or trailer body and any load which may be carried will tend to collapse the levers 14 and 15, i. e., move the common pivot point 16 towards the left viewing Figure 1. This in turn will move the rod 24 and the rod 22 also to the left. Moving the rod 22 rotates the lever 18 and thereby applies the brakes. Figure 2 shows the position of the several parts of my safety mechanism when the air supply has failed and the mechanism has applied the brakes.

Figure 3:
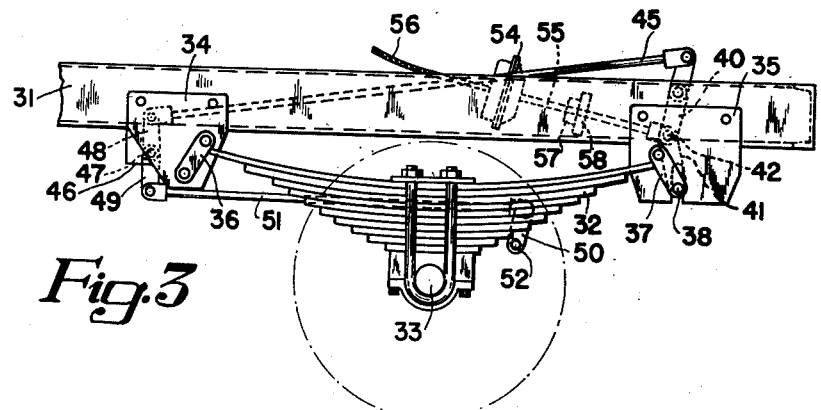
Figure 3 is a view similar to Figure 1 showing a modification of my invention.
Figure 4:
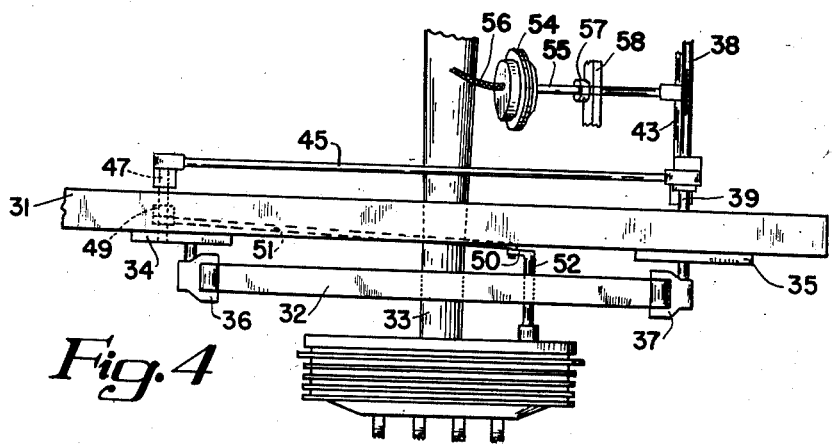
Figure 4 is a fragmentary plan view of the structure shown in Figure 3.
Figure 5:
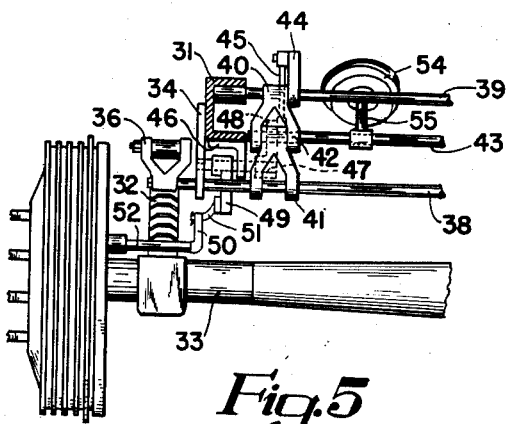
Figure 5 is a view from the rear of a truck or trailer showing the brake safety mechanism shown in Figures 3 and 4.

Figures 3, 4 and 5 show another form of my invention applied to a truck or trailer of the type in which both ends of the springs are mounted in shackles. This form is likewise applied to both rear wheels but only one is shown since the mechanism is the same on both wheels. Figure 3 shows a side channel 31 of a truck or trailer chassis mounted by means of springs 32 on an axle housing 33. Two plates 34 and 35 extend down from the side channel 31. Spring shackles 36 and 37 are pivotally secured to the two outer ends of the springs 32. The shackle 36 is also pivotally mounted on the plate 34 and the shackle 37 is also secured to a shaft 38 which extends the full width of the chassis. A second shaft 39 (see Figure 5) also extends across the width of the chassis and carries a forked lever 40. The shaft 38 carries a forked lever 41 and the levers 40 and 41 have a common pivot point 42 about a third shaft 43. As shown in Figure 3 the levers 40 and 41 thus form a pair of toggle levers with the shaft 43 forming the common pivot point. This shaft is operatively connected to the brake by mechanical linkage about to be described.

The shaft 39 also carries a lever 44 to which is rotatably pinned a rod 45. The plate 34 and a flange 46 secured to the bottom of side channel 31 support a short shaft 47 which in turn carries two levers 48 and 49. The outer end of the lever 48 is pinned to the rod 45 and the outer end of the lever 49 is connected to a cam lever 50 by a rod 51. The cam lever 50 is secured to a brake cam shaft 52. The truck or trailer carries a diaphragm housing 54 having a diaphragm piston 55 connected at its outer end to the shaft 43. An air hose 56 connects the diaphragm housing 54 with the air reservoir used for normal operation of the brakes. The connection between the lever 50 and the rod 51 is a lost motion connection similar to that shown in Figure 1A so that the brakes can be applied in normal operation without affecting the safety mechanism.

When the pressure of air in the reservoir is sufficient for normal operation of the brakes, the piston 55 is pushed outwardly to hold the levers 40 and 41 in the position shown in Figure 3, the outward movement of the rod 55 being limited by a stop 57 on the rod and a stop 58 on the truck chassis. Should the air pressure fail for any reason, the weight of the chassis 31, the truck or trailer body and any load carried will cause the toggle levers 40, 41 to collapse about their common pivot point 42. Rotation of the shaft 39 will pull the rod 45 to the right (viewing Figure 3) which in turn will rotate the levers 48 and 49, thus rotating the cam lever 50 by means of the rod 51 and applying the brakes.

Figures 6 to 9, inclusive, show my invention applied to a truck or trailer in which the chassis is mounted on wheels by springs 62 which float at both ends, the wheel on one side only being shown in these figures. Figure 6 shows the rear portion of a chassis having a side frame 59 from which extend two U-shaped spring yokes 60 and 61 in which the outer ends of the springs ride freely, upward movement of the yokes and chassis being restrained by a pin 63 in the yoke 60 and by the shaft 64 in the yoke 61. The shaft 64 extends across the width of the chassis to a yoke corresponding to the yoke 61 which is on the other side of the chassis. A radius rod 65 extends from the shaft 64 to a block 66 under the springs 62 and restrains longitudinal movement of an axle housing 67 relative to the vehicle chassis.

A strap 68 extends down from the side channel 59 and supports a shaft 69 which also extends across the width of the chassis, the other end of the shaft being supported by a strap similar to the strap 68. A pair of levers 70 are fastened at one of their ends to the shaft 69 and extend downwardly on either side of the springs 62 and carry at their free end a roller support 71 which rests on top of the springs. Rotation of the levers 70 and the shaft 69 actuates the brakes. The levers are connected to the brakes by a mechanical linkage now to be described.

The shaft 69 also carries a lever 72 having two arms, 72a and 72b, which extend on either side of the shaft 69. The truck or trailer carries a diaphragm housing 73 having a diaphragm piston 74, the outer end of which is pivoted to the lever arm 72b. The outer end of the arm 72a carries a rod 75 which connects at its other end with the upper arm 76a of a lever 76 which pivots on the shaft 64. The lower arm 76b of the lever 76 is connected by a rod 77 to the upper arm 78a of a cam lever 78 secured to a brake cam shaft 79. The lower arm 78b of the lever 78 is connected to a diaphragm piston 80 which moves in a diaphragm housing 81.

The diaphragm housing 81 is supplied with air by an air hose 82 from the air reservoir used for normal operation of the brakes. By a suitable valve (not shown), the truck driver can control the flow of air through the hose 82 to the housing 81 and apply the brakes in the normal manner. There is a lost motion connection between the rod 77 and the lever arm 78a similar to that shown in Figure 1A to permit normal braking without affecting the safety mechanism. The diaphragm housing 73 is supplied with air from the same reservoir by means of an air hose 83. If air in the truck reservoir is at a pressure suitable for normal brake operation, the housing 73 forces the diaphragm piston 74 outwardly thus rotating the lever 72 clockwise viewing Figure 6. This in turn rotates the lever 70 which holds the chassis of the truck or trailer away from the rear end of the springs 62. If the pressure in the reservoir falls, the truck or trailer chassis will fall towards the springs 62 and thereby rotate the levers 70 counterclockwise viewing Figure 3. Rotation of the levers 70 will rotate the shaft 69 and the lever 72 thereby pulling the rod 75 to the left and rotating the lever 76 counterclockwise. This rotation of the lever 76 will pull the rod 77 to the right and rotate the lever 78 clockwise thus turning the brake cam shaft 79 and applying the brakes. Figure 9 shows the various parts of my safety mechanism in the position which they assume when the air pressure fails and the brakes are applied.

From the foregoing it can be appreciated that I have invented a simple but wholly effective safety mechanism for air brakes. The safety mechanism automatically goes into effect when the pressure of air in the air brake system of the truck or chassis fails. The action of the mechanism is dependent solely upon the weight of the truck or trailer chassis, body and any load being carried. My safety mechanism requires no maintenance other than the routine greasing which is periodically performed on all trucks.

While I have described certain present preferred embodiments of my invention, it is to be understood that it may be otherwise variously embodied in the following claims.

I claim:

1. Safety mechanism for wheeled vehicles having brakes for the wheels and fluid pressure mechanism for applying the brakes in normal operation of the vehicle comprising a chassis, springs for mounting the chassis on the wheels, means linking the chassis at a point rearwardly of the wheels to the springs, said means being rotated upon variation in the distance between the chassis and the springs, means operable upon rotation of said first means to actuate the brakes, the brakes being applied upon decrease in the distance between the chassis and the springs, means operated by said fluid pressure mechanism and connected to the means linking the chassis and the springs whereby the linking means are restrained from rotation by said fluid pressure mechanism when said mechanism has sufficient pressure for normal operation of the brakes and permitted to rotate when there is insufficient pressure for normal operation.

2. Safety mechanism for wheeled vehicles having air brakes for the wheels and a reservoir of compressed air under the control of the operator for normal application of the brakes comprising a chassis, springs for mounting the chassis on the wheels, means connecting the chassis and the springs, said means being rotated upon variation in the distance between the chassis and the springs, and means operable upon rotation of said first means to actuate the brakes, the brakes being applied upon decrease in the distance between the chassis and the springs, a diaphragm housing connected to the air reservoir and a diaphragm piston in the housing connected to said rotatable means and adapted when the reservoir has a supply of air under pressure to restrain movement of the chassis towards the springs and to permit such movement when air pressure in the reservoir drops below that required for normal operation of the brakes.

3. Safety mechanism for wheeled vehicles having brakes for the wheels and fluid pressure mechanism for applying the brakes in normal operation of the vehicle comprising a chassis, springs for mounting the chassis on the wheels, rotatably mounted levers each having one end pivotally connected to the chassis at a point rearwardly of the wheels and the other end operatively connected to one end of the springs for mounting the chassis on the wheels, said levers being rotated upon variation in the distance between the chassis and the springs, a mechanical linkage between the levers and the vehicle brakes, the brakes being applied upon rotation of said levers when the distance between the chassis and the springs decreases, means operated by said fluid pressure mechanism and connected to said levers whereby said levers are restrained from rotation by said fluid pressure mechanism when said mechanism has sufficient pressure for normal operation of the brakes and permitted to rotate when there is insufficient pressure for normal operation.

4. In a vehicle having a chassis, wheels, springs for mounting the chassis on the wheels and air brakes for the wheels, the brakes having a cam for pressing brake shoes against a drum, a lever to turn the cam, a diaphragm housing and piston connected to the cam lever and a source of fluid under pressure under control of the operator for actuating the piston to apply the brakes, safety mechanism comprising levers rotatably mounted on the chassis at one of their ends and being operatively connected at the other end to one end of the vehicle springs, said levers being rotated upon variation in the distance between the chassis and the springs, connecting rods between the rotatable levers and said cam levers whereby a decrease in the distance between the chassis and the springs will actuate the brake.

5. In a vehicle having a chassis, wheels, springs for mounting the chassis on the wheels and air brakes for the wheels, the brakes having a cam for pressing brake shoes against a drum, a lever to turn the cam, a diaphragm housing and piston connected to the cam lever and a source of fluid under pressure under control of the operator for actuating the piston to apply brakes, safety mechanism comprising levers rotatably mounted on the chassis at one of their ends and being operatively connected at the other end to one end of the vehicle springs, said levers being rotated upon variation in the distance between the chassis and the springs, connecting rods between the rotatable levers and said cam levers whereby a decrease in the distance between the chassis and the springs will actuate the brakes, and a diaphragm housing and piston therein, the housing being connected to said air reservoir and the piston being connected to said rotatable levers at the ends of the levers which are operatively connected to the springs, the diaphragm and piston being adapted when said reservoir has a supply of air under pressure to restrain rotation of said rotatable levers and thereby restrain movement of the chassis towards the springs.

6. In a vehicle having a chassis, wheels, springs for mounting the chassis on the wheels and air brakes for the wheels, the brakes having a cam for pressing brake shoes against a drum, a lever to turn the cam, a diaphragm housing and piston connected to the cam lever and a source of fluid under pressure under control of the operator for actuating the piston to apply brakes, safety mechanism comprising toggle levers connected to the chassis and to one end of each spring, mechanical linkage between the common pivot point of the toggle levers and said cam lever, whereby collapse of the toggle levers upon movement of the chassis towards the springs will apply the brakes, and a diaphragm housing and piston therein, the housing being connected to said air reservoir and the piston being connected to the common pivot point of the toggle levers, the diaphragm and piston being adapted when said air reservoir has a supply of air under pressure to prevent collapse of said toggle levers.

7. In a vehicle having a chassis, wheels, springs for mounting the chassis on the wheels and air brakes for the wheels, the brakes having a cam for pressing brake shoes against a drum, a lever to turn the cam, a diaphragm housing and piston connected to the cam lever and a source of fluid under pressure under control of the operator for actuating the piston to apply the brakes, safety mechanism comprising levers secured at one end to a shaft rotatably mounted on the chassis, the levers carrying a support at their free ends which rests on a free end of the vehicle springs, a lever secured to said shaft and having one arm connected to a brake cam lever, a diaphragm piston connected to the other arm of said lever, and a diaphragm housing connected to said air reservoir for said piston, said shaft being rotated upon movement of the chassis towards the springs to apply the brakes, the diaphragm and piston being adapted when said reservoir has a supply of air under pressure to restrain said movement of the chassis towards the springs.

PALMER CLYDE WILSON.

References Cited in the file of this patent
UNITED STATES PATENTS

| Number | Name | Date |
|---|---|---|
| 1,253,130 | Bock | Jan. 8, 1918 |
| 2,409,908 | Simpkins | Oct. 22, 1946 |

FOREIGN PATENTS

| Number | Country | Date |
|---|---|---|
| 1,855 | Great Britain | Apr. 18, 1882 |